United States Patent
Okuyama et al.

(10) Patent No.: US 8,771,548 B2
(45) Date of Patent: *Jul. 8, 2014

(54) YTTRIUM—ALUMINUM—GARNET-TYPE PHOSPHOR

(71) Applicant: Panasonic Corporation, Kadoma (JP)

(72) Inventors: Kojiro Okuyama, Nara (JP); Takashi Ohbayashi, Osaka (JP); Seigo Shiraishi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/836,500

(22) Filed: Mar. 15, 2013

(65) Prior Publication Data

US 2013/0221276 A1    Aug. 29, 2013

Related U.S. Application Data

(63) Continuation of application No. PCT/JP2012/004337, filed on Jul. 4, 2012.

(30) Foreign Application Priority Data

Feb. 8, 2012   (JP) ................................ 2012-024708

(51) Int. Cl.
*C09K 11/68* (2006.01)

(52) U.S. Cl.
USPC .................................................... 252/301.5

(58) Field of Classification Search
USPC ........................................ 252/301.4 R, 301.5
See application file for complete search history.

(56) References Cited

U.S. PATENT DOCUMENTS

| | | | |
|---|---|---|---|
| 5,998,925 A | 12/1999 | Shimizu et al. | |
| 6,812,500 B2 | 11/2004 | Reeh et al. | |
| 8,137,585 B2 | 3/2012 | Song et al. | |
| 2006/0152135 A1 | 7/2006 | Choi et al. | |
| 2007/0247066 A1* | 10/2007 | Tokairin et al. | 313/506 |
| 2009/0017385 A1 | 1/2009 | Harada et al. | |
| 2009/0085465 A1 | 4/2009 | Hirosaki et al. | |
| 2009/0195143 A1 | 8/2009 | Song et al. | |
| 2009/0244356 A1 | 10/2009 | Cheng | |
| 2010/0171413 A1* | 7/2010 | Winkler et al. | 313/486 |
| 2011/0279998 A1* | 11/2011 | Su et al. | 362/84 |

FOREIGN PATENT DOCUMENTS

| | | |
|---|---|---|
| CN | 1331272 | 1/2002 |
| JP | 6-103915 | 4/1994 |
| JP | 3503139 | 3/2004 |
| JP | 2006-193712 | 7/2006 |

OTHER PUBLICATIONS

Phosphor Research Society ed. "Phosphor Handbook", edited by Keikoutai Dougakkai, published by Ohmsha, Ltd., pp. 12, 237-238, 266-278 & 332, (1987).

* cited by examiner

*Primary Examiner* — Emily Le
*Assistant Examiner* — Lynne Edmondson
(74) *Attorney, Agent, or Firm* — Hamre, Schumann, Mueller & Larson, P.C.

(57) ABSTRACT

It is an object to provide phosphors with high luminance. It also is an object to provide phosphors with less decrease in luminance due to a reduction in particle diameter. A first phosphor is represented by a general formula: $aYO_{3/2} \cdot (3-a)CeO_{3/2} \cdot bAlO_{3/2} \cdot cGaO_{3/2} \cdot fWO_3$ ($2.80 \leq a \leq 2.99$, $3.00 \leq b \leq 5.00$, $0 \leq c \leq 2.00$, $0.003 \leq f \leq 0.020$, where $4.00 \leq b+c \leq 5.00$). A second phosphor is represented by a general formula: $aYO_{3/2} \cdot (3-a)CeO_{3/2} \cdot bAlO_{3/2} \cdot cGaO_{3/2} \cdot gK_2WO_4$ ($2.80 \leq a \leq 2.99$, $3.00 \leq b \leq 5.00$, $0 \leq c \leq 2.00$, $0.003 \leq g \leq 0.015$, where $4.00 \leq b+c \leq 5.00$).

4 Claims, No Drawings

YTTRIUM—ALUMINUM—GARNET-TYPE PHOSPHOR

TECHNICAL FIELD

The present invention relates to an yttrium-aluminum-garnet-type phosphor that can be used for display devices and illumination devices.

BACKGROUND ART

Conventionally, a compound represented by a chemical formula $Y_3Al_5O_{12}$ has been known widely under the name of yttrium aluminum garnet and used in solid-state lasers, translucent ceramics, etc.

Particularly, it is known that phosphors (YAG:Ce) obtained by adding Ce ions that function as luminescence centers to yttrium aluminum garnet are excited by electron beams, ultraviolet rays, corpuscular beams such as blue light, or electromagnetic irradiation, and emit visible light of yellow-green. It also is known that the 1/10 decay time of the phosphors is extremely short, which is a few ns or less. Therefore, the phosphors are used widely in various light-emitting devices (for example, see Patent Documents 1, 2 and Non-Patent Document 1).

Typical examples of light-emitting devices provided with such yttrium-aluminum-garnet-type phosphors include white LEDs in which blue LEDs and yellow phosphors are combined, projectors using LEDs or LDs and phosphors, illumination light sources using white LEDs, LCDs with LED backlight, and sensors and intensifiers using phosphors.

Further, in plasma display panels with a 3D image display function (3D-PDP), if the decay time of phosphors to be used is long, an overlap between a left eye image and a right eye image becomes worse due to moving image crosstalk, which causes a left eye image and a right eye image that are displayed by fast switching to overlap each other, whereby satisfactory 3D video images cannot be displayed. To cope with this, as green phosphors for PDP displaying 3D images, a technology using YAG:Ce with significantly short decay time has been proposed (for example, see Patent Document 3).

PRIOR ART DOCUMENTS

Patent Documents

Patent Document 1: JP 3503139
Patent Document 2: U.S. Pat. No. 6,812,500
Patent Document 3: JP 2006-193712 A

Non-Patent Document

Non-Patent Document 1: Phosphor Handbook, edited by Keikoutai Dougakkai, published by Ohmsha, Ltd., pp. 12, 237-238, 268-278, 332)

DISCLOSURE OF INVENTION

Problem to be Solved by the Invention

However, in the above-described conventional method, since the luminance of YAG:Ce phosphors is low, it is difficult to configure high-efficiency light-emitting devices. Moreover, in the case of configuring white LEDs in which blue LEDs and YAG:Ce phosphors are combined, although a reduction in particle diameter of YAG:Ce phosphors can reduce variations in the color temperature of emitted white light, it further reduces luminance of the phosphors in the conventional technology. This makes it difficult to achieve both the reduction in variations in color temperature and high luminance.

The present invention has been achieved to solve the above-described conventional problems, and its object is to provide phosphors with high luminance. Further, its object is to provide phosphors with less decrease in luminance due to a reduction in particle diameter.

Means for Solving Problem

In order to solve the above-described problems, a first phosphor of the present invention is represented by a general formula: $aYO_{32}.(3-a)CeO_{32}.bAlO_{32}.cGaO_{32}.fWO_3$ ($2.80 \leq a \leq 2.99$, $3.00 \leq b \leq 5.00$, $0 \leq c \leq 2.00$, $0.003 \leq f \leq 0.020$, where $4.00 \leq b+c \leq 5.00$).

Further, a second phosphor of the present invention is represented by a general formula: $aYO_{32}.(3-a)CeO_{32}.bAlO_{32}.cGaO_{32}.gK_2WO_4$ ($2.80 \leq a \leq 2.99$, $3.00 \leq b \leq 5.00$, $0 \leq c \leq 2.00$, $0.003 \leq g \leq 0.015$, where $4.00 \leq b+c \leq 5.00$).

Effect of the Invention

According to the present invention, it is possible to provide phosphors with high luminance. Further, it is possible to provide phosphors with less decrease in luminance due to a reduction in particle diameter.

DESCRIPTION OF THE INVENTION

A first phosphor disclosed in the present application is represented by a general formula: $aYO_{32}.(3-a)CeO_{32}.bAlO_{32}.cGaO_{32}.fWO_3$ ($2.80 \leq a \leq 2.99$, $3.00 \leq b \leq 5.00$, $0 \leq c \leq 2.00$, $0.03 \leq f \leq 0.020$, where $4.00 \leq b+c \leq 5.00$).

Further, a second phosphor disclosed in the present application is represented by a general formula: $aYO_{32}.(3-a)CeO_{32}.bAlO_{32}.cGaO_{32}.gK_2WO_4$ ($2.80 \leq a \leq 2.99$, $3.00 \leq b \leq 5.00$, $0 \leq c \leq 2.00$, $0.003 \leq g \leq 0.015$, where $4.00 \leq b+c \leq 5.00$).

By including one of the configurations described above, the phosphors disclosed in the present application can be ones with short decay and high emission luminance, and also ones with less decrease in luminance due to a reduction in particle diameter. Therefore, by using the phosphors disclosed in the present application, it is possible to provide high-efficiency light-emitting devices.

In the above-described light-emitting devices, the value f of the first phosphor preferably is $0.005 \leq f \leq 0.010$, and the value g of the second phosphor preferably is $0.005 \leq g \leq 0.010$.

With this configuration, it is possible further to increase luminance of the respective phosphors.

Hereinafter, an embodiment of the present invention will be described in detail.

<Composition of Phosphors>

The first phosphor disclosed in the present application is represented by a general formula: $aYO_{32}.(3-a)CeO_{32}.bAlO_{32}.cGaO_{32}.fWO_3$ ($2.80 \leq a \leq 2.99$, $3.00 \leq b \leq 5.00$, $0 \leq c \leq 2.00$, $0.003 \leq f \leq 0.020$, where $4.00 \leq b+c \leq 5.00$). Note that a preferable range of f is $0.005 \leq f \leq 0.010$, in view of luminance.

Further, the second phosphor disclosed in the present application is represented by a general formula: $aYO_{32}.(3-a)CeO_{32}.bAlO_{32}.cGaO_{32}.gK_2WO_4$ ($2.80 \leq a \leq 2.99$, $3.00 \leq b \leq 5.00$, $0 \leq c \leq 2.00$, $0.003 \leq g \leq 0.01$, where $4.00 \leq b+$ $c≤5.00$). In this case, a preferable range of g is $0.005≤g≤0.010$, in view of luminance.

<Method of Producing Phosphors>

Hereinafter, a method of producing phosphors disclosed in the present application will be described. Note that the method of producing phosphors disclosed in the present application is not limited to the method below.

As materials, it is possible to use compounds that become oxides by sintering, such as a hydroxide, a carbonate and a nitrate of high purity (purity: 99% or more), or oxides of high purity (purity: 99% or more).

Further, in order to accelerate the reaction, it is preferable to add a small amount of a fluoride (aluminum fluoride, etc) or a chloride (zinc chloride, etc).

Phosphors are produced by mixing and sintering the above-described materials. A method of mixing the materials may be wet mixing in a solution or dry mixing of dry powder, and a ball mill, a medium agitation mill, a planetary mill, a vibration mill, a jet mill, a V-type mixer, an agitator, etc., which generally are used industrially, can be used.

First, mixed power is sintered at a temperature ranging from 1100° C. to 1600° C. for about 1 to 50 hours in the atmosphere.

Further, the mixed power is sintered at a temperature ranging from 1200° C. to 1400° C. for about 1 to 50 hours in an atmosphere of a given oxygen partial pressure formed by nitrogen gas or carbon dioxide gas containing 0 to 50% by volume of nitrogen, or mixed gas such as nitrogen gas containing 0 to 5% by volume of hydrogen.

As a furnace for sintering, a furnace that generally is used for industrial purposes can be used, and a continuous electric furnace such as a pusher furnace or a batch-type electric furnace, and further, a gas furnace can be used.

The obtained phosphor powder is crushed again using a ball mill or a jet mill, and washed or classified, if required, whereby a granular variation and flowability of the phosphor powder can be adjusted.

<Use of Phosphors>

Since the phosphors disclosed in the present application have high luminance, it is possible to configure high-efficiency light-emitting devices when applied to light-emitting devices with a phosphor layer. Specifically, in light-emitting devices with a phosphor layer in which conventional YAG:Ce phosphors are used, by replacing the conventional phosphors with the first phosphors or the second phosphors disclosed in the present application and following known methods as to parts other than the phosphor layer, the respective light-emitting devices may be configured.

Examples of light-emitting devices to which the phosphors disclosed in the present application are applied include white LEDs in which blue LEDs and yellow phosphors obtained by using phosphors disclosed in the present application are combined, light sources of projectors using LEDs or LDs and phosphors, and illumination light sources using white LEDs and LCD backlights with LED backlight, sensors and intensifiers using phosphors, 3D-PDPs, etc.

EXAMPLES

Hereinafter, phosphors disclosed in the present application will be described in detail with reference to specific examples and comparative examples. Note that the following examples do not limit the phosphors disclosed in the present application.

<Production of a First Phosphor Sample>

$Y_2O_3$, $Al_2O_3$, $Ga_2O_3$, $CeO_2$ and $WO_3$ were used as starting materials. The materials were weighed so as to obtain a predetermined composition and subjected to wet mixing in pure water using a ball mill. The mixture thus obtained was dried, and thereafter was sintered at a temperature ranging from 1,100° C. to 1,600° C. for four hours in the atmosphere. The mixture further was sintered at 1,200° C. to 1,400° C. for four hours in carbon dioxide gas containing 0 to 50% by volume of nitrogen to obtain a phosphor.

Further, the obtained phosphor powder was crushed again using the ball mill to adjust a particle size distribution.

<Luminance Measurement>

Phosphor samples corresponding to examples and comparative examples were subjected to luminance measurement under conditions below.

(1) Irradiating the respective phosphor samples with vacuum ultraviolet light having a wavelength of 146 nm in vacuum, and measuring emitted light in a green region (2) Irradiating the respective phosphor samples with blue light having a wavelength of 450 nm in the atmosphere, and measuring emitted light in a yellow region Table 1 shows composition ratios, average particle diameters and luminance (Y) of the produced phosphors. Here, the luminance (Y) represents luminance Y in an XYZ color specification system of Commission Internationale de l'Eclairage, which is a relative value in the case of setting a value Y to be 100 in a phosphor created as Sample No. 1 where a=2.80, b=5.00, c=0, and f=0. In Table 1, samples with a symbol "*" attached to Sample Nos. are phosphors corresponding to the comparative examples out of the range of the composition of the phosphor disclosed in the present application.

TABLE 1

| Sample No. | a | b | c | f | Average particle diameter (μm) | Relative value of luminance (%) 146 nm excitation | Relative value of luminance (%) 450 nm excitation |
|---|---|---|---|---|---|---|---|
| *1 | 2.80 | 5.00 | 0 | 0 | 10 | 100 | 100 |
| *2 | 2.80 | 5.00 | 0 | 0 | 5 | 92 | 85 |
| *3 | 2.80 | 5.00 | 0 | 0 | 2 | 87 | 76 |
| *4 | 2.70 | 5.20 | 0 | 0 | 10 | 78 | 83 |
| *5 | 2.70 | 5.20 | 0 | 0 | 5 | 72 | 74 |
| *6 | 2.70 | 5.20 | 0 | 0 | 2 | 69 | 66 |
| *7 | 2.80 | 0.50 | 4.00 | 0 | 10 | 43 | 52 |
| *8 | 2.80 | 0.50 | 4.00 | 0 | 5 | 38 | 43 |
| *9 | 2.80 | 0.50 | 4.00 | 0 | 2 | 36 | 34 |
| *10 | 2.80 | 5.00 | 0 | 0.050 | 10 | 89 | 84 |
| *11 | 2.80 | 5.00 | 0 | 0.050 | 5 | 86 | 80 |
| *12 | 2.80 | 5.00 | 0 | 0.050 | 2 | 82 | 78 |
| 13 | 2.80 | 5.00 | 0 | 0.020 | 10 | 112 | 117 |
| 14 | 2.80 | 5.00 | 0 | 0.020 | 5 | 108 | 109 |
| 15 | 2.80 | 5.00 | 0 | 0.020 | 2 | 103 | 103 |
| 16 | 2.99 | 5.00 | 0 | 0.003 | 10 | 118 | 106 |
| 17 | 2.99 | 5.00 | 0 | 0.003 | 5 | 112 | 100 |
| 18 | 2.99 | 5.00 | 0 | 0.003 | 2 | 103 | 93 |
| 19 | 2.97 | 3.00 | 2.00 | 0.010 | 10 | 142 | 125 |
| 20 | 2.97 | 3.00 | 2.00 | 0.010 | 5 | 139 | 120 |
| 21 | 2.97 | 3.00 | 2.00 | 0.010 | 2 | 136 | 112 |
| 22 | 2.97 | 4.00 | 1.00 | 0.005 | 10 | 148 | 133 |
| 23 | 2.97 | 4.00 | 1.00 | 0.005 | 5 | 141 | 126 |
| 24 | 2.97 | 4.00 | 1.00 | 0.005 | 2 | 137 | 120 |
| 25 | 2.98 | 3.90 | 1.10 | 0.005 | 10 | 155 | 125 |
| 26 | 2.98 | 3.90 | 1.10 | 0.005 | 5 | 149 | 115 |
| 27 | 2.98 | 3.90 | 1.10 | 0.005 | 2 | 140 | 109 |

As is apparent from Table 1, regarding the phosphors whose composition ratios are within the composition range disclosed in the present application, i.e., the phosphors satisfying the condition of ($2.80≤a≤2.99$, $3.00≤b≤5.00$, $0≤c≤2.00$, $0.003≤f≤0.020$, where $4.00≤b+c≤5.00$), the luminance obtained by excitation using vacuum ultraviolet light and the luminance obtained by excitation using blue light are both high. Among them, the phosphors indicated as Sample Nos. 19 to 27 in Table 1 whose composition ratios are within the range of $0.005 \leq f \leq 0.010$ have particularly high luminance. Further, a decrease in luminance due to a reduction in particle diameter of these phosphors is significantly small.

<Production of a Second Phosphor Sample>

$Y_2O_3$, $Al_2O_3$, $Ga_2O_3$, $CeO_2$ and $K_2WO_4$ were used as starting materials. The materials were weighed so as to obtain a predetermined composition and subjected to wet mixing in pure water using a ball mill. The mixture thus obtained was dried, and thereafter was sintered at a temperature ranging from 1,100° C. to 1,600° C. for four hours in the atmosphere. The mixture further was sintered at a temperature ranging from 1,200° C. to 1,400° C. for four hours in nitrogen gas or nitrogen gas containing 0 to 5% by volume of hydrogen to obtain a phosphor.

The obtained phosphor powder was crushed again using the ball mill to adjust a particle size distribution.

Table 2 shows composition ratios, average particle diameters and luminance (Y) of the produced phosphors, the luminance (Y) of the samples being measured by the above-described method. Here, Y is a relative value in the case of setting a value Y to be 100 in a phosphor created as Sample No. 1 in Table 1. Further, in Table 2, samples with a symbol "*" attached to Sample Nos. are phosphors corresponding to the comparative examples out of the range of the composition of the phosphor disclosed in the present application.

TABLE 2

| Sample No. | a | b | c | g | Average particle diameter (μm) | Relative value of luminance (%) 146 nm excitation | Relative value of luminance (%) 450 nm excitation |
|---|---|---|---|---|---|---|---|
| *28 | 2.80 | 5.00 | 0 | 0.040 | 10 | 76 | 74 |
| *29 | 2.80 | 5.00 | 0 | 0.040 | 5 | 74 | 70 |
| *30 | 2.80 | 5.00 | 0 | 0.040 | 2 | 70 | 66 |
| 31 | 2.80 | 5.00 | 0 | 0.015 | 10 | 118 | 120 |
| 32 | 2.80 | 5.00 | 0 | 0.015 | 5 | 114 | 113 |
| 33 | 2.80 | 5.00 | 0 | 0.015 | 2 | 108 | 108 |
| 34 | 2.99 | 5.00 | 0 | 0.003 | 10 | 122 | 111 |
| 35 | 2.99 | 5.00 | 0 | 0.003 | 5 | 114 | 104 |
| 36 | 2.99 | 5.00 | 0 | 0.003 | 2 | 106 | 96 |
| 37 | 2.97 | 3.00 | 2.00 | 0.010 | 10 | 148 | 130 |
| 38 | 2.97 | 3.00 | 2.00 | 0.010 | 5 | 142 | 124 |
| 39 | 2.97 | 3.00 | 2.00 | 0.010 | 2 | 138 | 115 |
| 40 | 2.97 | 4.00 | 1.00 | 0.005 | 10 | 152 | 132 |
| 41 | 2.97 | 4.00 | 1.00 | 0.005 | 5 | 148 | 123 |
| 42 | 2.97 | 4.00 | 1.00 | 0.005 | 2 | 140 | 120 |
| 43 | 2.98 | 3.90 | 1.10 | 0.005 | 10 | 159 | 132 |
| 44 | 2.98 | 3.90 | 1.10 | 0.005 | 5 | 150 | 124 |
| 45 | 2.98 | 3.90 | 1.10 | 0.005 | 2 | 143 | 118 |

As is apparent from Table 2, regarding the phosphors whose composition ratios are within the composition range disclosed in the present application, i.e., the phosphors satisfying the condition of ($2.80 \leq a \leq 2.99$, $3.00 \leq b \leq 5.00$, $0 \leq c \leq 2.00$, $0.003 \leq g \leq 0.015$, where $4.00 \leq b+c \leq 5.00$), the luminance obtained by excitation using vacuum ultraviolet light and the luminance obtained by excitation using blue light are both high. Among them, the phosphors indicated as Sample Nos. 37 to 45 in Table 2 whose composition ratios are within the range of $0.005 \leq g \leq 0.010$ have particularly high luminance. Further, a decrease in luminance due to a reduction in particle diameter of these phosphors is significantly small.

As can be seen from the measurement results described above, both of the first phosphors and the second phosphors disclosed in the present application have high luminance. Therefore, by applying these phosphors as phosphors of light-emitting devices with a phosphor layer, it is possible to configure high-efficiency light-emitting devices.

Specifically, by using the first phosphors or the second phosphors disclosed in the present application in place of the conventional YAG:Ce phosphors as phosphors contained in a phosphor layer, light-emitting devices with favorable emission characteristics can be obtained easily without changing the other constituent elements of the light-emitting devices.

Examples of light-emitting devices using the phosphors disclosed in the present application may include various types of devices, such as light-emitting diodes (LED), semiconductor lasers (LD), plasma display panels (PDP), and further, projectors and illumination light sources of white LEDs, sensors and intensifiers.

Industrial Applicability

By using the phosphors of the present invention, high-efficiency light-emitting devices can be configured. Therefore, the phosphors of the present invention are applicable for use in white LEDs in which blue LEDs and yellow phosphors are combined, projectors using LEDs or LDs and phosphors, and illumination light sources using white LEDs and LCDs with LED backlight, sensors and intensifiers using phosphors, 3D-PDPs, etc.

The invention claimed is:

1. A phosphor represented by a general formula:
   $aYO_{3/2}\cdot(3-a)CeO_{3/2}\cdot bAlO_{3/2}\cdot cGaO_{3/2}\cdot fWO_3$
   ($2.80 \leq a \leq 2.99$, $3.00 \leq b \leq 5.00$, $0 \leq c \leq 2.00$, $0.003 \leq f \leq 0.020$, where $4.00 \leq b+c \leq 5.00$).

2. The phosphor according to claim 1, wherein in the general formula:
   $aYO_{3/2}\cdot(3-a)CeO_{3/2}\cdot bAlO_{3/2}\cdot cGaO_{3/2}\cdot fWO_3$,
   $0.005 \leq f \leq 0.010$.

3. A phosphor represented by a general formula:
   $aYO_{3/2}\cdot(3-a)CeO_{3/2}\cdot bAlO_{3/2}\cdot cGaO_{3/2}\cdot gK_2WO_4$
   ($2.80 \leq a \leq 2.99$, $3.00 \leq b \leq 5.00$, $0 \leq c \leq 2.00$, $0.003 \leq g \leq 0.015$, where $4.00 \leq b+c \leq 5.00$).

4. The phosphor according to claim 3, wherein in the general formula:
   $aYO_{3/2}\cdot(3-a)CeO_{3/2}\cdot bAlO_{3/2}\cdot cGaO_{3/2}\cdot gK_2WO_4$,
   $0.005 \leq g \leq 0.010$.

* * * * *